United States Patent
Zhu et al.

(10) Patent No.: US 12,255,815 B2
(45) Date of Patent: Mar. 18, 2025

(54) MESSAGE FORWARDING METHOD, SYSTEM, DEVICE, NODE DEVICE, AND STORAGE MEDIUM

(71) Applicant: ZTE Corporation, Guangdong (CN)

(72) Inventors: Xiangyang Zhu, Guangdong (CN); Jinghai Yu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 364 days.

(21) Appl. No.: 17/622,764

(22) PCT Filed: May 19, 2021

(86) PCT No.: PCT/CN2021/094620
§ 371 (c)(1),
(2) Date: Dec. 24, 2021

(87) PCT Pub. No.: WO2021/238741
PCT Pub. Date: Dec. 2, 2021

(65) Prior Publication Data
US 2022/0247682 A1 Aug. 4, 2022

(30) Foreign Application Priority Data
May 25, 2020 (CN) .......................... 202010449905.2

(51) Int. Cl.
*H04L 45/74* (2022.01)
*H04L 45/00* (2022.01)

(52) U.S. Cl.
CPC .............. *H04L 45/74* (2013.01); *H04L 45/34* (2013.01)

(58) Field of Classification Search
CPC ..... H04L 12/4641; H04L 43/20; H04L 45/02; H04L 45/34; H04L 45/42; H04L 45/74; H04L 45/302; H04L 69/22; H04L 2101/659
USPC ................................ 370/225, 230, 235, 238
See application file for complete search history.

(56) References Cited

U.S. PATENT DOCUMENTS

| | | | |
|---|---|---|---|
| 2016/0218794 A1 | 7/2016 | Matsumoto et al. | |
| 2019/0132150 A1 | 5/2019 | Ramachandran et al. | |
| 2021/0119895 A1* | 4/2021 | Li | H04L 43/20 |

(Continued)

FOREIGN PATENT DOCUMENTS

| | | |
|---|---|---|
| CN | 108809707 A | 11/2018 |
| CN | 110024339 A | 7/2019 |
| CN | 110611924 A | 12/2019 |

(Continued)

OTHER PUBLICATIONS

European Patent Office. Extended European Search Report for EP Application No. 21811771.1, mailed Sep. 23, 2022, pp. 1-8.

(Continued)

*Primary Examiner* — Harun Chowdhury
(74) *Attorney, Agent, or Firm* — Vivacqua Crane, PLLC (57) ABSTRACT

A message forwarding method, a system, a device, a node device, and a storage medium are disclosed. The message forwarding method, applied to a first node device, may include: carrying a time sensitive networking (TSN) profile in a segment routing header of a segment routing Internet protocol version 6 (SRv6) service message of deterministic networking; and sending the SRv6 service message carrying the TSN profile.

7 Claims, 6 Drawing Sheets

(56) References Cited

U.S. PATENT DOCUMENTS

2021/0250281 A1\* 8/2021 Li .......................... H04L 45/302

FOREIGN PATENT DOCUMENTS

| CN | 110831249 A | 2/2020 |
| CN | 110971433 A | 4/2020 |
| EP | 3499805 A1 | 6/2019 |

OTHER PUBLICATIONS

Geng, et al. "Internet Draft: SRv6 for Deterministic Networking (DetNet)" IEEE Internet Engineering Task Force, Jul. 3, 2019, retrieved from https://tools.ietf.org/html/draft-geng-spring-srv6-for-detnet-00.

Wang, et al. "Internet Draft: DetNet Data Plane: IEEE 802.1 Time Sensitive Networking over SRv6," IEEE Internet Engineering Task Force, Apr. 30, 2020, retrieved from https://tools.ietf.org/html/draft-wang-detnet-tsn-over-srv6-01.

International Searching Authority. International Search Report and Written Opinion for PCT Application No. PCT/CN2021/094620 and English translation, mailed Aug. 17, 2021, pp. 1-10.

The State Intellectual Property Office of People's Republic of China. First Office Action for CN Application No. 2020104499052 and English translation, mailed Mar. 13, 2024, pp. 1-12.

The State Intellectual Property Office of People's Republic of China. First Search Report for CN Application No. 2020104499052 and English translation, mailed Mar. 8, 2024, pp. 1-5.

\* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type  | Segment Left  |
+-+-+-+-+-+-+-+-+-+-+-+-+-+-+-+-+-+-+-+-+-+-+-+-+-+-+-+-+-+-+-+-+
|   Last Entry  |      Flag     |              Tag              |
+-+-+-+-+-+-+-+-+-+-+-+-+-+-+-+-+-+-+-+-+-+-+-+-+-+-+-+-+-+-+-+-+
|                                                               |
|                                                               |
|      Location & Function (Segment List [0] for relay node or edge node)      |
|                                                               |
|                                                               |
+-+-+-+-+-+-+-+-+-+-+-+-+-+-+-+-+-+-+-+-+-+-+-+-+-+-+-+-+-+-+-+-+
|                                                               |
|                             . . .                             |
+-+-+-+-+-+-+-+-+-+-+-+-+-+-+-+-+-+-+-+-+-+-+-+-+-+-+-+-+-+-+-+-+
|                                                               |
|                                                               |
|                        Segment List [n]                       |
|                                                               |
|                                                               |
+-+-+-+-+-+-+-+-+-+-+-+-+-+-+-+-+-+-+-+-+-+-+-+-+-+-+-+-+-+-+-+-+
|    Type=3     |   Length=2    |  SCENARIO=1 : SPECIFIED=1     |
+-+-+-+-+-+-+-+-+-+-+-+-+-+-+-+-+-+-+-+-+-+-+-+-+-+-+-+-+-+-+-+-+
```

Fig. 6b

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type  | Segment Left  |
+-+-+-+-+-+-+-+-+-+-+-+-+-+-+-+-+-+-+-+-+-+-+-+-+-+-+-+-+-+-+-+-+
|   Last Entry  |      Flag     |              Tag              |
+-+-+-+-+-+-+-+-+-+-+-+-+-+-+-+-+-+-+-+-+-+-+-+-+-+-+-+-+-+-+-+-+
|                                                               |
|                                                               |
|      Location & Function (Segment List [0] for relay node or edge node)      |
|                                                               |
|                                                               |
+-+-+-+-+-+-+-+-+-+-+-+-+-+-+-+-+-+-+-+-+-+-+-+-+-+-+-+-+-+-+-+-+
|                                                               |
|                             . . .                             |
+-+-+-+-+-+-+-+-+-+-+-+-+-+-+-+-+-+-+-+-+-+-+-+-+-+-+-+-+-+-+-+-+
|                                                               |
|                                                               |
|                        Segment List [n]                       |
|                                                               |
|                                                               |
+-+-+-+-+-+-+-+-+-+-+-+-+-+-+-+-+-+-+-+-+-+-+-+-+-+-+-+-+-+-+-+-+
|                                                               |
|                 TSN Profile Segment Identifier                |
|                                                               |
+-+-+-+-+-+-+-+-+-+-+-+-+-+-+-+-+-+-+-+-+-+-+-+-+-+-+-+-+-+-+-+-+
|                                                               |
|                         Optional TLV                          |
|                             . . .                             |
+-+-+-+-+-+-+-+-+-+-+-+-+-+-+-+-+-+-+-+-+-+-+-+-+-+-+-+-+-+-+-+-+
```

MESSAGE FORWARDING METHOD, SYSTEM, DEVICE, NODE DEVICE, AND STORAGE MEDIUM

CROSS-REFERENCE TO RELATED APPLICATION

This application is a national stage filing under 35 U.S.C. § 371 of international application number PCT/CN2021/094620, filed May 19, 2021, which claims priority to Chinese patent application No. 202010449905.2, filed May 25, 2020. The contents of these applications are incorporated herein by reference in their entirety.

TECHNICAL FIELD

The present disclosure relates to, but is not limited to, the technical field of communications.

BACKGROUND

By providing TSN service, time sensitive networking (TSN) provides Ethernet transport service with bounded delay, lower jitter and extremely low packet loss rate in a layer-2 bridged network. Deterministic networking (DetNet) can be used to provide deterministic services for DetNet service in a layer-3 network, and can expand an SRH (segment routing header) of the segment routing Internet protocol version 6 (SRv6) to carry DetNet information.

SUMMARY

According to an aspect of the present application, an embodiment of the present disclosure provides a message forwarding method, which is applied to a first node device, and includes: carrying a time sensitive networking (TSN) profile in a segment routing header of a segment routing Internet protocol version 6 (SRv6) service message of deterministic networking; and sending the SRv6 service message carrying the TSN profile.

According to another aspect of the present application, an embodiment of the present disclosure provides a message forwarding method, which is applied to a second node device, and includes: acquiring a time sensitive networking (TSN) profile carried by a segment routing header from the segment routing header of a received segment routing Internet protocol version 6 (SRv6) service message of deterministic networking; and processing the message according to the TSN profile.

According to yet another aspect of the present application, an embodiment of the present disclosure provides a message forwarding method, including: using a first node device to carry a time sensitive networking (TSN) profile in a segment routing header of a segment routing Internet protocol version 6 (SRv6) service message of deterministic networking and send the SRv6 service message carrying the TSN profile; and using a second node device to acquire the time sensitive networking (TSN) profile carried by the segment routing header from the segment routing header of the received SRv6 service message of deterministic networking and process the message according to the TSN profile.

According to yet another aspect of the present application, an embodiment of the present disclosure provides a first node device, including: a message encapsulation module, configured to carry a time sensitive networking (TSN) profile in a segment routing header of a segment routing Internet protocol version 6 (SRv6) service message of deterministic networking; and a message sending module, configured to send the SRv6 service message carrying the TSN profile.

According to yet another aspect of the present application, an embodiment of the present disclosure provides a second node device, including: a policy acquisition module, configured to acquire a time sensitive networking (TSN) profile carried by a segment routing header of a received segment routing Internet protocol version 6 (SRv6) service message of deterministic networking from the segment routing header; and a message processing module, configured to process the message according to the TSN profile.

According to yet another aspect of the present application, an embodiment of the present disclosure provides a message forwarding system, including: a first node device, configured to carry a time sensitive networking (TSN) profile in a segment routing header of a segment routing Internet protocol version 6 (SRv6) service message of deterministic networking and send the SRv6 service message carrying the TSN profile; and a second node device, configured to acquire the time sensitive networking (TSN) profile carried by the segment routing header from the segment routing header of the received SRv6 service message of deterministic networking and process the message according to the TSN profile.

According to yet another aspect of the present application, an embodiment of the present disclosure provides a message forwarding device, including a memory and a processor, where the memory is configured to store a program which, when executed by the processor, causes the processor to perform the message forwarding method according to any aspect.

According to yet another aspect of the present application, an embodiment of the present disclosure provides a non-transitory computer-readable storage medium storing instructions which, when executed by a processor, cause the processor to perform the message forwarding method according to any aforementioned aspect.

DETAILED DESCRIPTION

In order to make the object, technical scheme and advantages of the present disclosure clearer, embodiments of the present disclosure will be illustrated in detail hereinafter with reference to the accompanying drawings. It should be noted that under the condition of no conflicts, the embodiments in the present disclosure and the features in the embodiments can be arbitrarily combined together.

The TSN (Time Sensitive Networking) working group for IEEE (Institute of Electrical and Electronics Engineers) 802.1Q standards proposed various methods and mechanisms (e.g. traffic scheduling (IEEE 802.1Qbv), per-stream filtering (IEEE 802.1Qci) and cyclic queuing and forwarding (IEEE 802.1Qch)) with bounded delay, lower jitter and extremely low packet loss rate for TSN service in layer-2 bridged networks. These methods and mechanisms can be flexibly combined to meet the needs of TSN service under specific scenarios and requirements. Configuration and application made for network nodes to provide TSN services in a certain application scenario are called a TSN profile.

The Internet engineering task force (IETF) has solved various problems of providing deterministic services for DetNet service in a layer-3 network in the deterministic networking working group. Some drafts propose a method of performing DetNet SRv6 encapsulation in an SRv6 (Segment Routing for IPv6) network, which expands an SRH of SRv6 to carry DetNet information. Based on this, the DetNet working group further proposed a method of TSN local area network domain connection over DetNet SRv6 (TSN over DetNet SRv6) in other drafts.

When employing DetNet SRv6 to perform TSN local area network domain connection, edge nodes of SRv6 domains can identify a TSN service flow and convert same into a DetNet SRv6 service flow but cannot provide the DetNet service within an SRv6 network with services meeting requirements of a TSN network.

Therefore, the present disclosure particularly provides a message forwarding method, system and device, node devices and a storage medium, which substantially avoid one or more of the problems caused by the disadvantages and limitations of related technologies. According to the message forwarding method, system and device, node devices and storage medium of the present disclosure, by expanding the capability of SRv6, a TSN profile to be announced to each node is encapsulated and carried in an SRv6 SRH by the first node device, and this profile is transmitted together with a DetNet SRv6 service message; when receiving the message, each node in a DetNet SRv6 network can know a TSN policy to be applied to the message by the node by extracting and parsing the TSN profile carried in the SRH, so as to announce and transmit TSN information in SRv6 and provide encapsulated DetNet packets with services meeting requirements of TSN through the node in an SRv6 domain.

Figure 1:
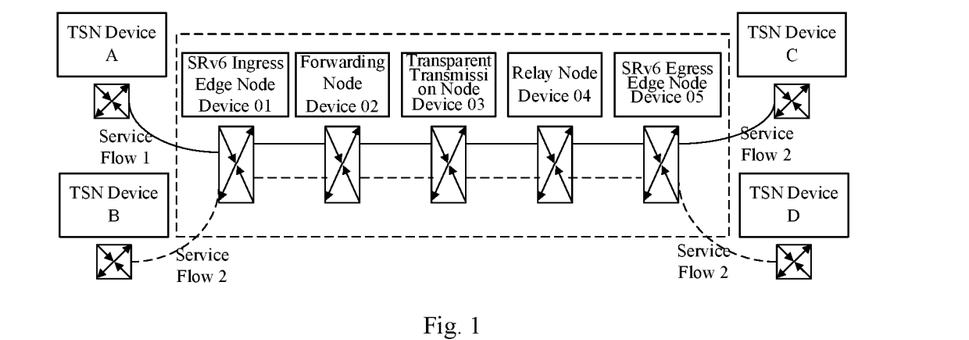
FIG. 1 illustrates a schematic diagram of a scenario of TSN local area network domain connection over DetNet SRv6.

FIG. 1 illustrates a schematic diagram of a scenario of TSN local area network domain connection over DetNet SRv6. As shown in FIG. 1, a TSN local area network domain may be a TSN simulated network domain.

This scenario includes two TSN service flows, one of which is a service flow transmitted from a TSN device A to a TSN device C and the other of which is a service flow transmitted from a TSN device B to a TSN device D.

In FIG. 1, the service flow (service flow 1) transmitted from the TSN device A to the TSN device C is forwarded by an ingress edge node device 01, a forwarding node device 02, a transparent transmission node device 03, a relay node device 04 and an egress edge node device 05 in the SRv6 domain to reach the TSN device C; and the service flow (service flow 2) transmitted from the TSN device B to the TSN device D is forwarded by the ingress edge node device 01, the forwarding node device 02, the transparent transmission node device 03, the relay node device 04 and the egress edge node device 05 in the SRv6 domain to reach the TSN device D.

The types and number of the node devices in the SRv6 domain shown in FIG. 1 are merely schematic and should not be construed as a limitation to the scope of protection of the present disclosure. Moreover, for the sake of simplicity of description, in the following embodiments, the node devices in the TSN local area network domain may be simply referred to as nodes. For example, the ingress edge node device may be simply referred to as an ingress edge node, and the forwarding node device 02, the transparent transmission node device 03 and the relay node device 04 may be simply referred to as a forwarding node, a transparent transmission node and a relay node.

In FIG. 1, through a controller (not shown in the figure) or a network management device, a DetNet SRv6 profile is sent to the SRv6 ingress edge node, and the SRv6 ingress edge node may identify the TSN service flows and convert the identified TSN service flows into DetNet SRv6 service flows. In some embodiments, the SRv6 ingress edge node can perform TSN service flow identification and DetNet SRv6 segmented routing header (SRH) mapping and indicate a policy of copying a flow identifier ID and a message sequence number.

In the embodiments of the present disclosure, the forwarding node and the relay node in the SRv6 domain also may be able to identify the DetNet service flows and provide the DetNet service flows with deterministic services that meet requirements. However, in the scenario of TSN local area network domain connection over DetNet SRv6, because the DetNet SRv6 message does not carry a TSN profile related to TSN traffic. The forwarding node in the SRv6 domain cannot know the TSN profile carried by the current DetNet SRv6 service flow, and as a result, service sublayer and transport sublayer services which meet requirements of a TSN network cannot be provided for the deterministic service flows.

In FIG. 1, if the two TSN service flows received by the ingress edge node of the DetNet SRv6 network have different application scenarios and service requirements, the forwarding node in the SRv6 network domain may provide corresponding TSN services for the two service flows, e.g. different gating policies, traffic shaping and congestion protection.

Figure 2:
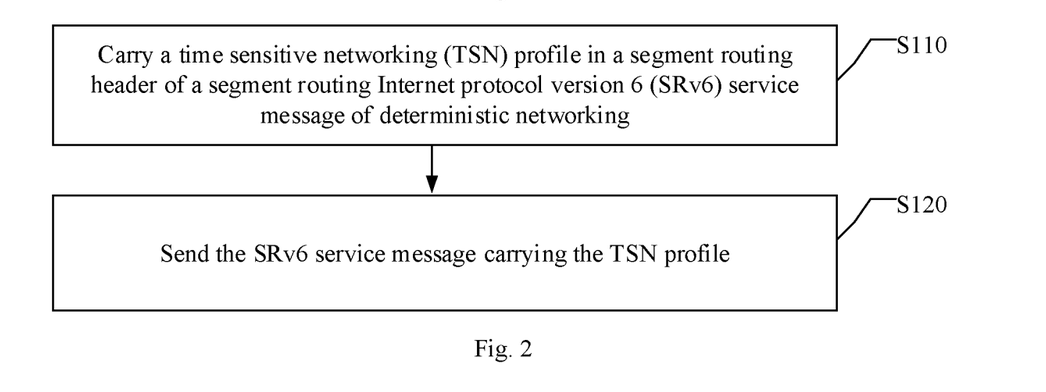
FIG. 2 is a flowchart illustrating a message forwarding method according to the present disclosure.

FIG. 2 is a flowchart illustrating a message forwarding method according to the present disclosure. The message forwarding method of the present disclosure may be applied to (or executed by) the first node device. As shown in FIG. 2, the method may include the following.

At S110, a time sensitive networking (TSN) profile is carried in a segment routing header of a segment routing Internet protocol version 6 (SRv6) service message of deterministic networking.

At S120, the SRv6 service message carrying the TSN profile is sent.

In the present disclosure, the first node device may be an ingress edge node device. The node device may be a router or a switch, or may be a repeater in the network architecture of a software defined network (SDN).

According to the message forwarding method disclosed by the present disclosure, by expanding the capability of SRv6, a TSN profile to be announced to each node is carried in the segment routing header of the SRv6 message by the ingress edge node device, and the DetNet SRv6 service message carrying the TSN profile is sent. Therefore, when receiving the message, each node device in the DetNet SRv6 network can acquire a TSN policy to be applied to the message by the node device by extracting and parsing the TSN profile carried in the SRH.

In an embodiment, the transmittable TSN profile includes but is not limited to one or more of the following profile items in different application scenarios:

- a TSN profile for Time-Sensitive Networking for Fronthaul application scenarios, applied to IEEE P802.1CM-2018;
- a TSN profile for Industrial Automation application scenarios, applied to IEC (International Electrotechnical Commission)/IEEE 60802;
- a TSN profile for quality of Quality of Service Provision by Network Systems application scenarios, applied to IEEE P802.1DC;
- a TSN profile for Service Provider Networks application scenarios, applied to IEEE P802.1DF;
- a TSN profile for Automotive In-Vehicle Ethernet Communications application scenarios, applied to IEEE P802.1DG; and
- a TSN profile for Enhancements to Fronthaul Profiles to Support New Fronthaul Interface, Synchronization, and Syntonization Standards application scenarios, applied to IEEE P802.1CM.

The TSN profiles in the different application scenarios in the aforementioned example may be construed as a general description of the TSN profile in each application scenario. According to the categories and characteristics of transmitted service flows, the TSN profile may be subdivided into specified profiles, and each specified profile may be composed of a set of specific forwarding actions and policies.

As an example, taking the TSN profile for Automotive In-Vehicle Ethernet Communications application scenarios applied to IEEE P802.1DG as an example, the TSN profile may include a plurality of specified profiles, e.g. a profile for audio systems, a profile for video systems or a profile for control systems listed in the IEEE P802.1DG protocol draft.

In an embodiment, S110 may include the following steps. At S10, a TSN profile is determined according to the category and/or characteristic of a service flow of a predetermined message, where the predetermined message is a received TSN service message or an SRv6 service message obtained after flow mapping according to the TSN service message; and at S20, the TSN profile is carried in a Type-Length-Value (TLV) format in a segment routing header.

A Type field in the TLV format is used to indicate the type of the TSN profile, and a Value field in the TLV format is used to indicate the TSN profile in each predetermined application scenario.

In this embodiment, the TSN profile may be a TSN profile determined according to the characteristic of the inbound TSN message of the first node device or the characteristic of the SRv6 message after TSN message mapping.

In an embodiment, the service flow category may be used to indicate a category to which a service flow belongs, including, but not limited to, audio and video service, industrial control service, automobile control service, etc.

In an embodiment, the service flow characteristic may include a service flow ID. For example, within the DetNet SRv6 network, a service flow ID (DetNet flow-ID) of deterministic networking may be used to uniquely identify a service flow of deterministic networking. The service flow characteristic may be carried in the header of SRv6.

In an embodiment, the value of the Value field is a TSN profile in a predetermined application scenario; or the Value field includes a SCENARIO field and a SPECIFIED field, where the SCENARIO field is used to identify a predetermined application scenario and the SPECIFIED field is used to identify a TSN profile corresponding to the predetermined application scenario.

In this embodiment, the TSN profile may be encoded in a TLV format. In TLV format encoding, a value of Type may be assigned to indicate that TLV is the type of the TSN profile, and the specified profile in each scenario can be specified by a value of Value.

Figure 3A:
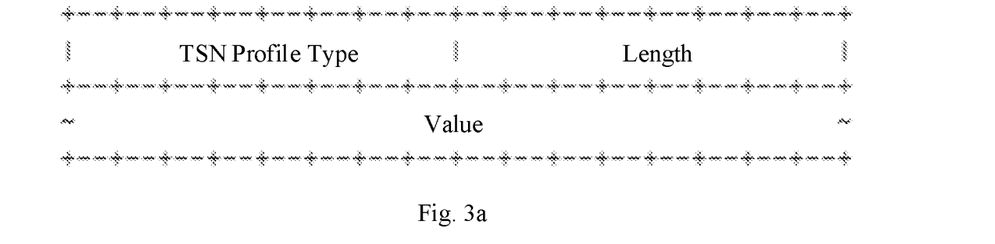
FIG. 3a is a schematic diagram of a TLV (Type-Length-Value) format encoding mode for a TSN profile according to the present disclosure.
Figure 3B:
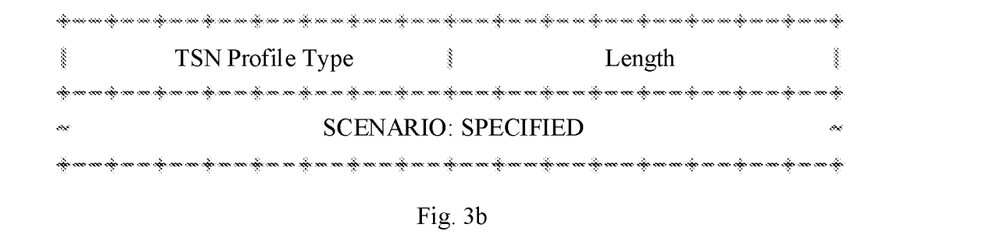
FIG. 3b is a schematic diagram of a TLV format encoding mode for a TSN profile according to the present disclosure.

With reference to FIG. 3a and FIG. 3b, two TLV format encoding modes for a TSN profile in the present disclosure will be described hereinafter. FIG. 3a is a schematic diagram of a TLV format encoding mode for a TSN profile according to the present disclosure; and FIG. 3b is a schematic diagram of a TLV format encoding mode for a TSN profile according to the present disclosure.

As shown in FIG. 3a, the TSN profile is encoded into a TLV (Type, Length, Value) format, in which TLV-profile Type denotes the type of the TSN profile, the value of Length is used to represent the length of the TSN profile, and the value of the Value field is in one-to-one correspondence to a specified profile in each application scenario.

As an example, in the TLV format of the TSN profile, the Type field may have a length of, for example, 1 octet, and Type is assigned with 3; the Length field may have a length of, for example, 1 octet, and Length has a value of 2, indicating that the Value field occupies 2 octets; and the Value field has a length of 2 octets. The Value field is in one-to-one correspondence to a specified profile in each scenario.

With reference to the TLV encoding format in FIG. 3a, as an example, value=1 may refer to, for example, a profile for Audio Systems in a P802.1DG application scenario; P802.1DG is used to identify the application scenario, and the profile for Audio Systems identifies a specified profile commonly used in the application scenario.

As other examples, value=2 in FIG. 3a may refer to, for example, a profile for Video Systems applied to a P802.1DG application scenario;

Value=3 may refer to, for example, a profile for Control Systems in a P802.1DG application scenario;

Value=4 may refer to a first profile Profile 1 in a P802.1DF application scenario; and Value=5 may refer to a second profile Profile 2 in a P802.1DF application scenario, with Profile 1 being different from Profile 2.

It should be understood that the aforementioned values of the Value field are not limited to the aforementioned examples, and in practical applications, the value of the Value field may be set according to actual needs, not specifically limited by the present disclosure.

As shown in FIG. 3b, the TSN profile is encoded into a TLV format, in which the Value field may be divided into two parts: a SCENERIO field and a SPECIFIED field. The SCENERIO field is used to specify an application scenario of the TSN profile, and the SPECIFIED field is used to specify a specified profile in the application scenario. The combination of the values of these two fields can uniquely determine a specific profile in a certain application scenario.

As an example, the Value field has a length of 2 octets, with SCENERIO and SPECIFIED each occupying 1 octet. As an example, SCENERIO and SPECIFIED in the length of the Value field are expressed in the format of "SCENERIO: SPECIFIED".

With reference to the TLV encoding format in FIG. 3b, as an example, value=1:1 may refer to a profile for Audio Systems in a P802.1DG application scenario.

As other examples, value=1:2 in FIG. 3b refers to a profile for Video Systems in a P802.1DG application scenario;

Value=1:3 refers to a profile for Control Systems in a P802.1DG application scenario; . . . ;

Value=2:1 refers to a first profile Profile 1 in a P802.1DF application scenario;

Value=2:2 refers to a second profile Profile 2 in a P802.1DF application scenario, with Profile 1 being different from Profile 2; and in the aforementioned description of FIG. 3a and FIG. 3b, the TLV formats, the values and the meanings in the TSN profiles listed are merely for illustration, not a limitation to the present disclosure. In practical applications, they can be set according to specific application scenarios, which will not be repeated here.

In an embodiment, S110 may include the following steps S21 to S23.

At S21, flow matching and flow mapping are performed on the header information of the received TSN service message to obtain a service flow identifier of the TSN service message, and an SRv6 service message of deterministic networking converted from the TSN service message is obtained.

At S22, based on a mapping relationship between the preset service flow identifier and a TSN profile, the TSN profile corresponding to the service flow identifier is determined according to the TSN service message.

At S23, predetermined deterministic service configuration information and the TSN profile are carried in a segment routing header of the SRv6 service message of deterministic networking.

In this embodiment, the SRv6 ingress edge node processes the header information of the received TSN service message, the mapping relationship between the service flow identifier ID and the TSN profile can be maintained in the SRv6 ingress edge node, and the mapping relationship may be obtained by configuration by the controller or announcement in the TSN bridged network domain, which is not specifically limited by the present disclosure.

Figure 4:
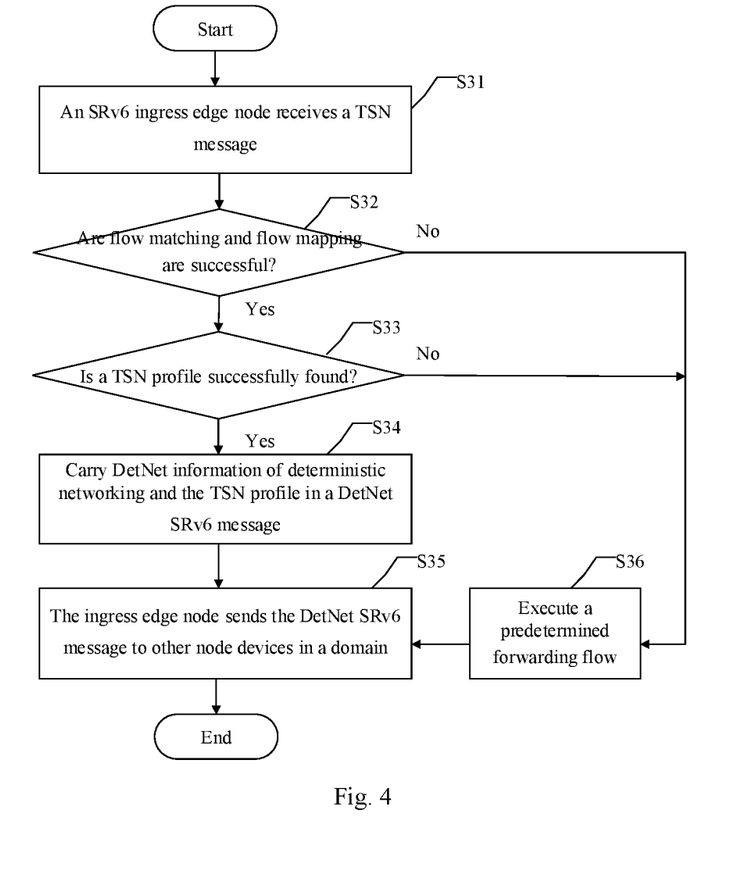
FIG. 4 illustrates a schematic flowchart of using an SRv6 ingress edge node to process a TSN service message according to the present disclosure.
Figure 5:
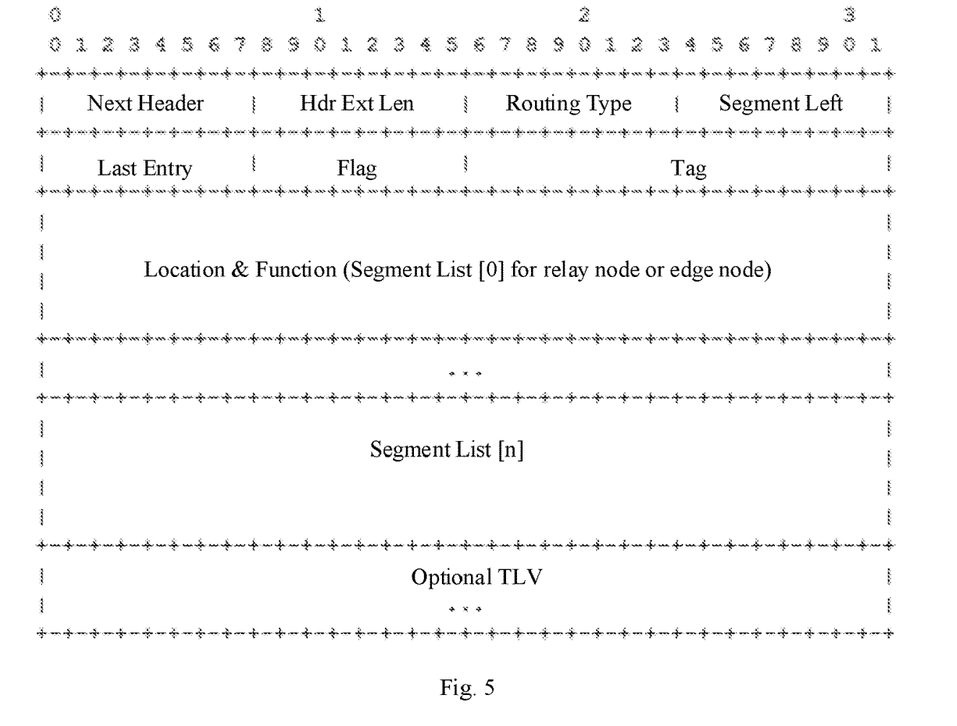
FIG. 5 illustrates a schematic diagram of an existing SRv6 SRH format in the present disclosure.

FIG. 4 illustrates a schematic flowchart of using an SRv6 ingress edge node to process a TSN service message according to the present disclosure. As shown in FIG. 5, In an embodiment, using the SRv6 ingress edge node to process a TSN service message may include the following steps S31 to S36.

At S31, the SRv6 ingress edge node receives the TSN message.

At S32, whether flow matching and flow mapping are successfully performed on the TSN message is judged. If so, S33 is executed, otherwise, S36 is executed.

In this step, the flow matching performed on the TSN message may include: determining a service flow identifier of the TSN message according to message attribute information and a flow matching rule. The flow matching rule may include a corresponding relationship between the message attribute information and the service flow identifier, and the flow identifier can be used to identify the message containing the message attribute information; and in this step, the TSN service message may be converted into an SRv6 service message of deterministic networking through flow mapping (conversion).

At S33, if flow matching and flow mapping are successfully performed on the TSN message, a TSN profile corresponding to the service flow identifier is searched according to a mapping relationship between the service flow identifier and the TSN profile.

In this step, if the TSN profile is found successfully, S34 is executed; or if the TSN profile is not found successfully, S35 is executed.

At S34, DetNet information and the TSN profile are carried in the DetNet SRv6 message.

In this step, the DetNet information may be deterministic service configuration information corresponding to deterministic service requirements obtained in advance.

At S35, the SRv6 ingress edge node sends the DetNet SRv6 message to other node devices in the SRv6 network domain.

At S36, if the TSN profile is not found successfully, message forwarding is performed according to a predetermined DetNet SRv6 message forwarding process.

In this embodiment, after receiving the TSN service message, the SRv6 ingress edge node performs flow matching and flow mapping according to the header of the TSN message to obtain a TSN message ID and the DetNet SRv6 service message; according to the TSN message ID, a preset message ID and TSN profile table is looked up to obtain a TSN profile corresponding to the TSN service flow; if matching or querying fails, the original forwarding process is continued, otherwise, the DetNet information and the TSN profile are encapsulated together into a DetNet SRv6 packet, and the DetNet SRv6 packet is forwarded.

In an embodiment, S110 may include the following S41, S42 or S43.

At S41, optional Type-Length-Value information is carried in a segment routing header, with the optional Type-Length-Value information being used to carry the TSN profile; or at S42, a non-forwarding type of segment identifier (SID) is carried in the segment routing header, with the non-forwarding type of segment identifier (SID) being used to carry the TSN profile; or at S43, the TSN profile is carried by using information of other information fields of an existing forwarding type of SID in the segment routing header.

FIG. 5 illustrates a schematic diagram of an existing SRv6 SRH format. As shown in FIG. 5, the SRv6 SRH includes the following fields:

Next Header, identifying the type of a header following the SRH;

Hdr Ext Len, the length of the SRH, e.g. a length from Segment List [0] to Segment List [n] in the SRH;

Routing Type, identifying a routing header type;

Segment Left, the number of intermediate nodes needing to be accessed before arriving at a destination node;

Last Entry, containing an index of the last element of a segment list in the segment list;

Flag;

Tag, identifying an intra-group packet;

Location and Function (Segment List [0] for relay node or edge node);

Segment List [n]; and a variable-length optional TLV field.

Figure 6A:
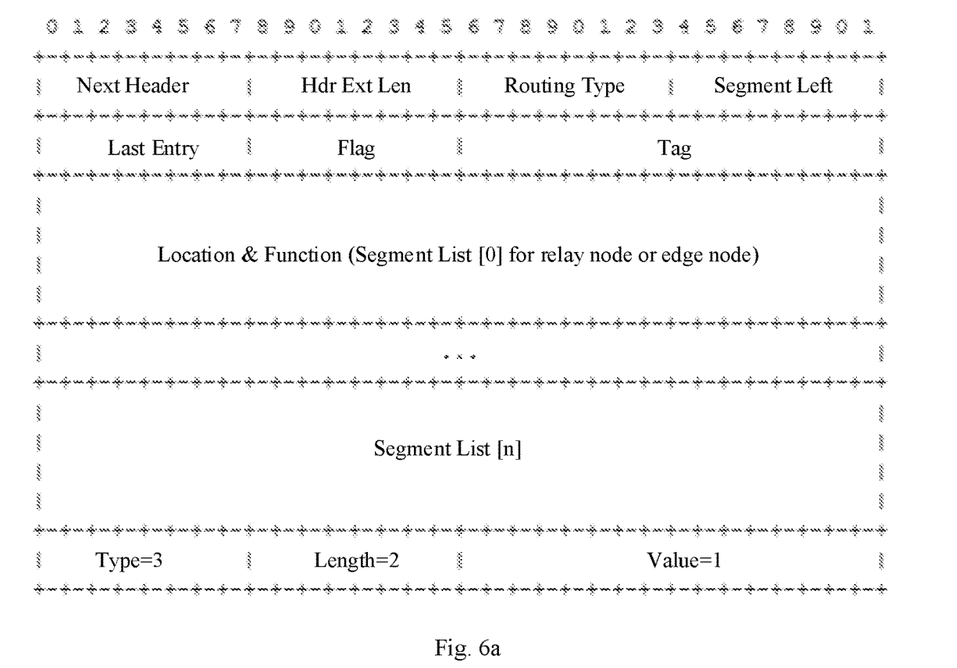
FIG. 6a illustrates a schematic structural diagram of a message that carries a TSN profile by expanding a variable-length TLV field, according to the present disclosure.

When a TSN profile may be carried in the SRH shown in FIG. 5, the SRH can be expanded in various ways, so that the TSN profile can be carried by the DetNet SRv6 message. Three ways of expanding an SRH of an SRv6 message when a TSN profile may be carried in the SRH will be described hereinafter with reference to the drawings. For details of specific expanded message formats, reference may be made to each embodiment. FIG. 6a illustrates a schematic structural diagram of a message that carries a TSN profile by expanding a variable-length TLV field, according to the present disclosure; and FIG. 6b illustrates a schematic structural diagram of a message that carries a TSN profile by expanding a variable-length TLV field, according to the present disclosure.

As shown in FIG. 6a, a TSN profile may be carried by the variable-length TLV field of an SRv6 SRH, and a Value field in the variable-length TLV field corresponds to a specified TSN profile in a predetermined application scenario.

Taking a profile for Audio Systems in a P802.1DG application scenario as an example, in FIG. 6a, Type=3 refers to the type of a TSN profile, Length=2 refers to the length of the TSN profile, and value=1 may refer to, for example, a profile for Audio Systems in a P802.1DG application scenario.

Figure 6B:
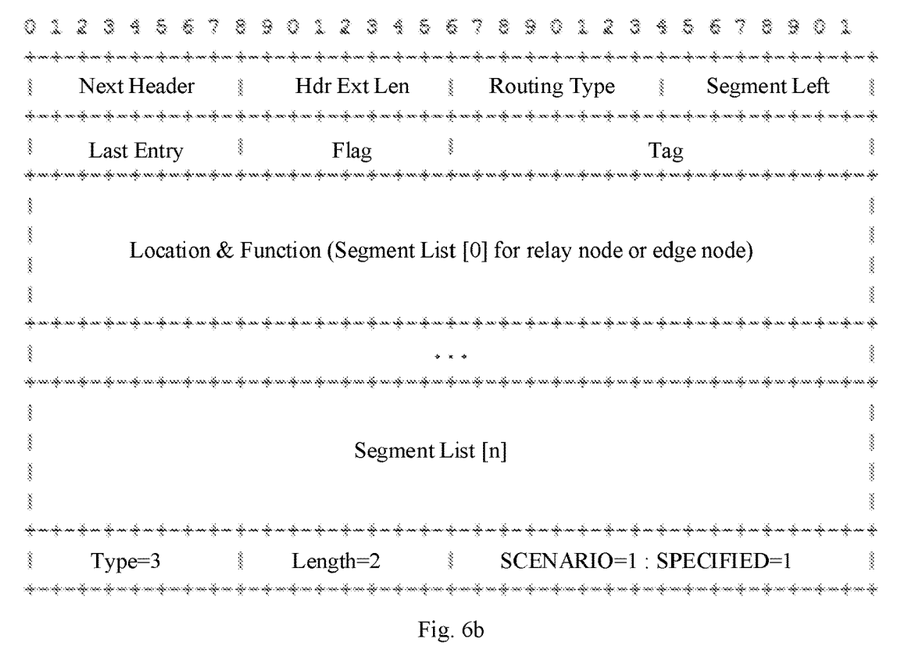
FIG. 6b illustrates a schematic structural diagram of a message that carries a TSN profile by expanding a variable-length TLV field, according to the present disclosure.

As shown in FIG. 6b, a TSN profile may be carried by the variable-length TLV field of an SRv6 SRH, and the Value field in the variable-length TLV field includes a SCENERIO field and a SPECIFIED field.

SCENERIO=1 refers to a P802.1DG application scenario, and SPECIFIED=1 refers to a profile for Audio Systems in a P802.1DG application scenario.

In FIG. 6a and FIG. 6b, the TSN profiles are carried in the Optional TLV fields, and the Optional TLV field may also contain other TLVs, which is not specifically limited by the present disclosure.

Figure 7:
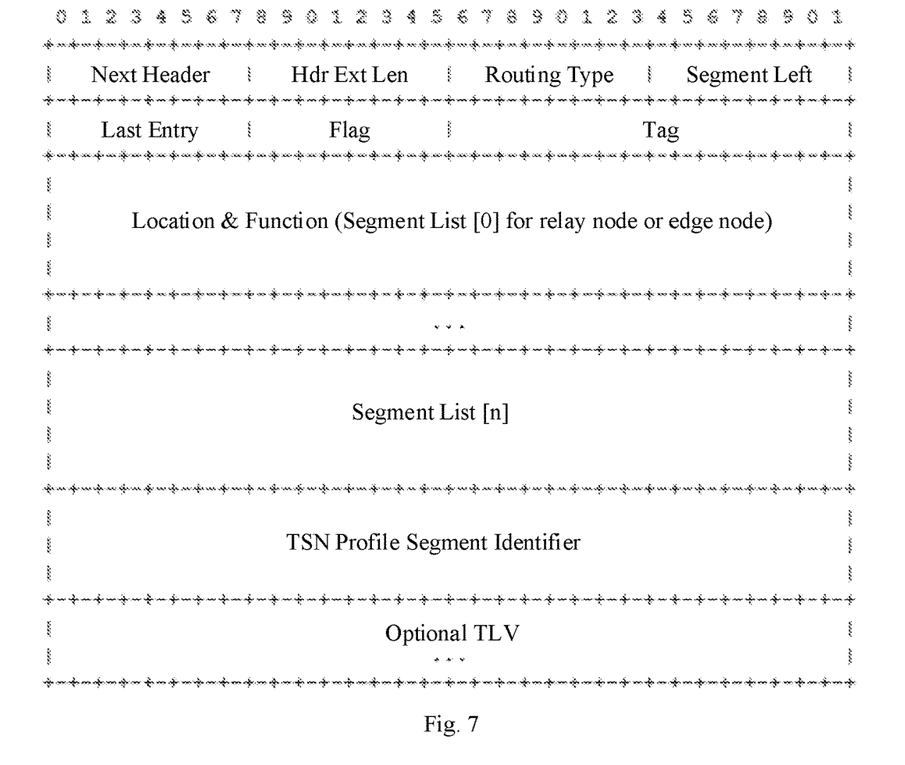
FIG. 7 illustrates a schematic structural diagram of a message that carries a TSN profile through a non-forwarding type of SRv6 segment identifier (SID) field, according to the present disclosure.

FIG. 7 illustrates a schematic structural diagram of a message that carries a TSN profile through a non-forwarding type of SRv6 segment identifier (SID) field, according to the present disclosure.

In FIG. 7, a non-forwarding type of TSN profile segment identifier (profile SID) may be added in an SRH of SRv6. The TSN profile SID may be located after the Segment List [n] of a forwarding type of SID list or before the Segment List [0] of the SID list. The location of the TSN profile SID does not affect the parsing and application of TSN actions.

In FIG. 7, for the format and value of a TSN profile carried in the TSN profile SID, refer to the formats of the TSN profiles and the values of the TLV fields when the TSN profiles are carried in the Optional TLV fields in FIG. 6a and FIG. 6b, which will not be repeated in the present disclosure. Moreover, the location of the TSN profile SID in the SRH as an example in this embodiment is merely for illustration, and should not be construed as a limitation to the scope of protection of the present disclosure.

Figure 8:
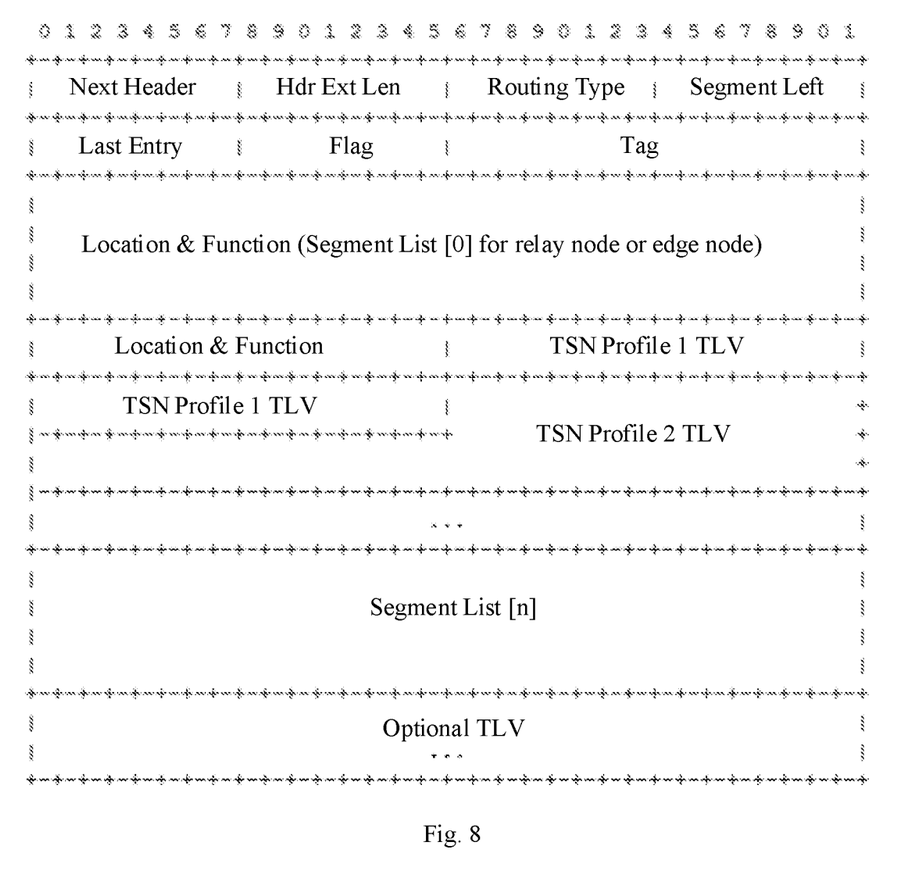
FIG. 8 illustrates a schematic structural diagram of a message that carries a TSN profile through an existing forwarding type of SRv6 segment identifier (SID) field, according to the present disclosure.

FIG. 8 illustrates a schematic structural diagram of a message that carries a TSN profile through an existing forwarding type of SRv6 segment identifier (SID) field, according to the present disclosure.

In FIG. 8, a forwarding type of SRv6 SID contains Locator (LOC), Function (FUNC) and Args (ARG), and the SRv6 SID may be expressed as LOC: FUNC: ARG.

LOC may be used to route and forward packets, FUNC may be used to indicate a forwarding action performed by a device, and ARG may be used to provide functions supporting other information. In the present disclosure, TSN profiles may be carried by ARG.

If there are two TSN profiles: a TSN-profile 1 and a TSN-profile 2, with a TSN-profile 1 TLV field occupying a total of 4 octets and a TSN-profile 2 TLV field occupying a total of 6 octets, then the way of carrying the two TSN profiles in ARG is shown in FIG. 8.

It should be noted that the formats of the TSN profiles carried by ARG in the present disclosure are not specifically limited, for example, whether the LOC and FUNC fields occupy 16 bits or not is not considered in the present disclosure. For the formats and values of the TSN profiles carried by ARG, refer to the formats of the TSN profiles and the values of the TLV fields when the TSN profiles are carried in the optional TLV fields in FIG. 6a and FIG. 6b. In the present disclosure, the number of the TSN profiles carried by ARG is merely for illustration, and should not be construed as a limitation to the scope of protection of the present disclosure.

According to the message forwarding method, by expanding the capability of SRv6, a TSN profile to be announced to each node device in an SRv6 domain can be carried in an SRv6 SRH by the ingress edge node, and this profile is transmitted together with a DetNet SRv6 service message; and when receiving the message, each node in a DetNet SRv6 network can know a TSN policy to be applied to the message by the node by extracting and parsing the TSN profile carried in the SRH, so that the forwarding node and the relay node in the SRv6 domain can provide deterministic service flows with service sublayer and transport sublayer services which meet requirements of a TSN network.

Figure 9:
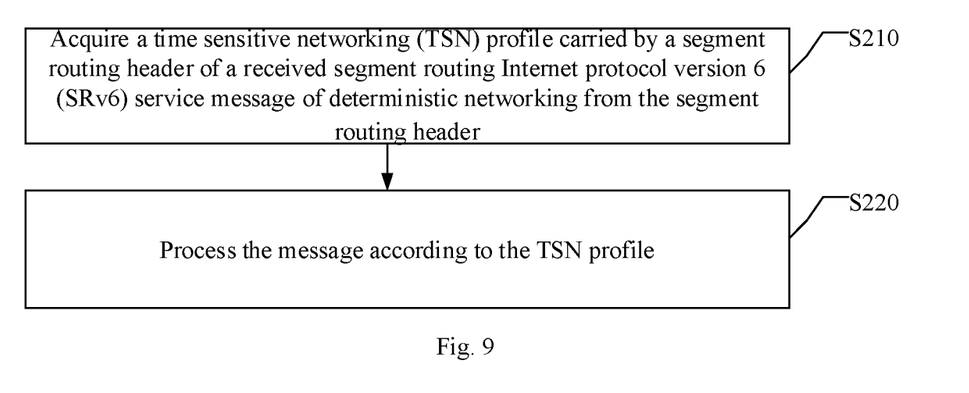
FIG. 9 illustrates a schematic flowchart of a message forwarding method according to the present disclosure.

FIG. 9 illustrates a schematic flowchart of a message forwarding method according to the present disclosure. The message forwarding method may be applied to (or executed by) a second node device, which may be, for example, a node device in an SRv6 domain. As shown in FIG. 9, the message forwarding method may include the following steps S210 and S220.

At S210, a time sensitive networking (TSN) profile carried by a segment routing header of a received segment routing Internet protocol version 6 (SRv6) service message of deterministic networking is acquired from the segment routing header.

At S220, the message is processed according to the TSN profile.

In an embodiment, in S210, acquiring the TSN profile carried by the segment routing header may include the following.

At S51, the TSN profile is acquired through optional Type-Length-Value information carried by the segment routing header; or at S52, the TSN profile is acquired through a non-forwarding type of segment identifier (SID) carried by the segment routing header; or at S53, the TSN profile is acquired by using information of other information fields of an existing forwarding type of SID in the segment routing header.

At S51, if nodes in a DetNet SRv6 domain find that an optional TLV field is not empty when receiving the expanded DetNet SRv6 message, the optional TLV field is parsed. If Type is a preset TSN-profile type, the message is processed according to a value of Type and a value of Value in the optional TLV field.

At S52, when receiving the expanded DetNet SRv6 message, the node in the DetNet SRv6 domain sequentially process an SID; if the type of the SID is a TSN profile SID, then the value of the SID is extracted to obtain the carried TSN profile, and the message is processed according to values of Type and Value after sequential extraction. The TSN profile SID is a non-forwarding type of segment identifier (SID) newly added in SRv6.

At S53, the SRv6 SID may be expressed as LOC: FUNC: ARG among which ARG may be used to carry a TSN profile. When the node sequentially processes the SIDs in the SRH of the DetNet SRv6 message, if the content of ARG is not empty, the content of ARG is extracted to obtain the TSN-profile TLV field, and the message is processed according to values of Type and Value in the TLV field. In this step, the TSN profile is carried by the expanded SRv6 SID itself.

In an embodiment, the TSN profile is of a Type-Length-Value (TLV) format, a Type field in the TLV format is used to indicate the type of the TSN profile, and a Value field in the TLV format is used to indicate the TSN profile in each predetermined application scenario.

In an embodiment, the value of the Value field is a TSN profile in a predetermined application scenario; or the Value field includes a SCENARIO field and a SPECIFIED field, where the SCENARIO field is used to identify a predetermined application scenario and the SPECIFIED field is used to identify a TSN profile corresponding to the predetermined application scenario.

According to the message forwarding method of the present disclosure, when receiving the DetNet SRv6 message, each node in the DetNet SRv6 domain can know a TSN policy to be applied to the message by the node by extracting and parsing the TSN profile carried in the SRH of the message, and process the message according to the TSN policy, so as to provide the deterministic service flow in the SRv6 network with service sublayer and transport sublayer services which meet requirements of a TSN network.

Figure 10:
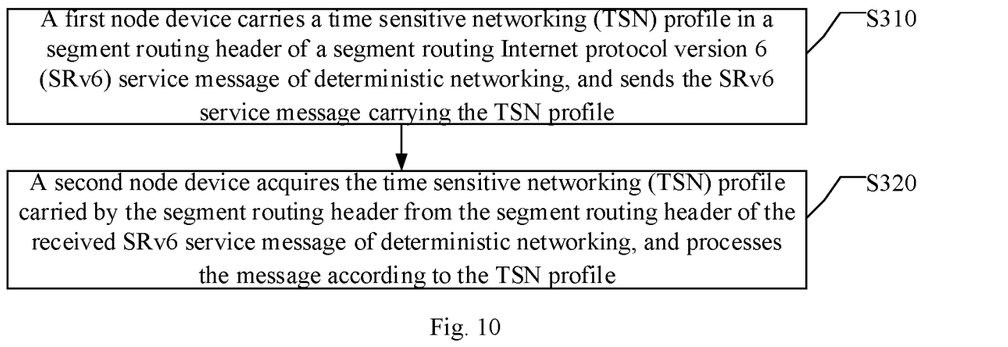
FIG. 10 illustrates a schematic flowchart of a message forwarding method according to the present disclosure.

FIG. 10 illustrates a schematic flowchart of a message forwarding method according to the present disclosure. The message forwarding method may be applied to a first forwarding device and a second forwarding device. The method includes the following steps S310 and S320.

At S310, a time sensitive networking (TSN) profile is carried in a segment routing header of a segment routing Internet protocol version 6 (SRv6) service message of deterministic networking by a first node device, and the SRv6 service message carrying the TSN profile is sent.

At S320, the time sensitive networking (TSN) profile carried by the segment routing header is acquired from the segment routing header of the received SRv6 service message of deterministic networking by a second node device; and the message is processed according to the TSN profile.

In this embodiment, for a message processing flow of the first node device, refer to the corresponding process in the message forwarding method applied to the first node device described in the previous embodiment; for a message processing flow of the second node device, refer to the corresponding process in the message forwarding method applied to the second node device described in the previous embodiment, and therefore they will not be repeated here.

Figure 11:
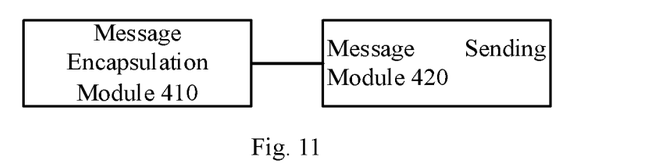
FIG. 11 illustrates a schematic structural diagram of a first node device provided according to the present disclosure.

Node devices according to the present disclosure will be introduced in detail hereinafter with reference to the drawings. FIG. 11 illustrates a schematic structural diagram of the first node device provided according to the present disclosure. The first node device may be an ingress edge node device in an SRv6 domain. As shown in FIG. 11, the first node device includes a message encapsulation module 410 and a message sending module 420.

The message encapsulation module 410 is configured to carry a time sensitive networking (TSN) profile in a segment routing header of a segment routing Internet protocol version 6 (SRv6) service message of deterministic networking; and the message sending module 420 is configured to send the SRv6 service message carrying the TSN profile.

In an embodiment, the message encapsulation module 410 may include: a profile determination unit, configured to determine a TSN profile according to the category and/or characteristic of a service flow of a predetermined message which is a received TSN service message or an SRv6 service message obtained after flow mapping according to the TSN service message; and a profile encapsulation unit, configured to carry the TSN profile in a Type-Length-Value (TLV) format in a segment routing header, with a Type field in the TLV format being used to indicate the type of the TSN profile and a Value field in the TLV format being used to indicate the TSN profile in each predetermined application scenario.

In an embodiment, the value of the Value field is a TSN profile in each predetermined application scenario; or the Value field includes a SCENARIO field and a SPECIFIED field, where the SCENARIO field is used to identify a predetermined application scenario and the SPECIFIED field is used to identify a TSN profile corresponding to the predetermined application scenario.

In an embodiment, the message encapsulation module 410 may include: a flow matching and mapping unit, configured to perform flow matching and flow mapping on the header information of a received TSN service message to obtain a service flow identifier of the TSN service message and obtain an SRv6 service message of deterministic networking converted from the TSN service message; and a profile mapping unit, configured to determine a TSN profile corresponding to the service flow identifier according to the TSN service message based on a mapping relationship between the preset service flow identifier and the TSN profile; and the message encapsulation module 410 is further configured to carry predetermined deterministic service configuration information and the TSN profile in a segment routing header of the SRv6 service message of deterministic networking.

In an embodiment, the message encapsulation module 410 may be configured to carry optional Type-Length-Value information in a segment routing header, with the optional Type-Length-Value information being used to carry the TSN profile; or carry a non-forwarding type of segment identifier (SID) in the segment routing header, with the non-forwarding type of segment identifier (SID) being used to carry the TSN profile; or carry the TSN profile by using information of other information fields of an existing forwarding type of SID in the segment routing header.

According to the first node device of the present disclosure, by expanding the capability of SRv6, a TSN profile to be announced to each node is encapsulated and carried in an SRv6 SRH by the ingress edge node, and this profile is transmitted together with a DetNet SRv6 service message, so that the node in the SRv6 domain can provide encapsulated DetNet packets with services meeting requirements of TSN.

It should be noted that the present disclosure is not limited to the specific configurations and processing described in the above embodiments and shown in the drawings. For the convenience and conciseness of description, the detailed description of known methods is omitted here, and for the specific operating processes of the aforementioned system, modules and units, refer to the corresponding process in the aforementioned method, which will not be repeated here.

Figure 12:
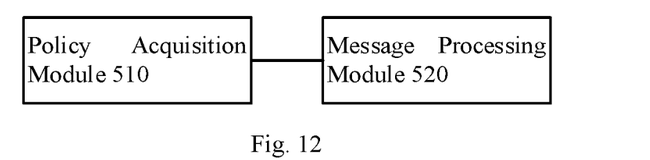
FIG. 12 illustrates a schematic structural diagram of a second node device provided according to the present disclosure.

FIG. 12 illustrates a schematic structural diagram of a second node device provided according to the present disclosure. The second node device may be a forwarding node and a relay node in an SRv6 domain. As shown in FIG. 12, the second node device includes a policy acquisition module 510 and a message processing module 520.

The policy acquisition module 510 is configured to acquire a time sensitive networking (TSN) profile carried by a segment routing header from the segment routing header of a received segment routing Internet protocol version 6 (SRv6) service message of deterministic networking; and the message processing module 520 is configured to process the message according to the TSN profile.

In an embodiment, when acquiring the time sensitive networking (TSN) profile carried by the segment routing header, the policy acquisition module 510 may be configured to acquire the TSN profile through optional Type-Length-Value information carried by the segment routing header; or acquire the TSN profile through a non-forwarding type of segment identifier (SID) carried by the segment routing header; or acquire the TSN profile by using information of other information fields of an existing forwarding type of SID in the segment routing header.

In an embodiment, the TSN profile is of a Type-Length-Value (TLV) format, a Type field in the TLV format is used to indicate the type of the TSN profile, and a Value field in the TLV format is used to indicate the TSN profile in each predetermined application scenario.

In an embodiment, the value of the Value field is a TSN profile in each predetermined application scenario; or the Value field includes a SCENARIO field and a SPECIFIED field, where the SCENARIO field is used to identify a predetermined application scenario and the SPECIFIED field is used to identify a TSN profile corresponding to the predetermined application scenario.

According to the second node device of the present disclosure, when receiving the message, each node in a DetNet SRv6 network can know a TSN policy to be applied to the message by the node by extracting and parsing the TSN profile carried in the SRH, so as to announce and transmit TSN information in a DetNet SRv6 network domain and provide encapsulated DetNet packets with services meeting requirements of TSN.

It should be noted that the present disclosure is not limited to the specific configurations and processing described in the above embodiments and shown in the drawings. For the convenience and conciseness of description, the detailed description of known methods is omitted here, and for the specific operating processes of the aforementioned system, modules and units, refer to the corresponding process in the aforementioned method, which will not be repeated here.

Figure 13:
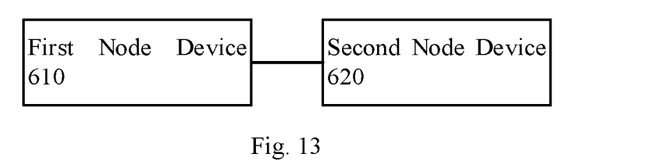
FIG. 13 illustrates a schematic structural diagram of a message forwarding system provided according to the present disclosure.

FIG. 13 illustrates a schematic structural diagram of a message forwarding system provided according to the present disclosure. As shown in FIG. 13, the message forwarding system may include a first node device 610 and a second node device 620.

The first node device 610 is configured to carry a time sensitive networking (TSN) profile in a segment routing header of a segment routing Internet protocol version 6 (SRv6) service message of deterministic networking and send the SRv6 service message carrying the TSN profile.

The second node device 620 is configured to acquire the time sensitive networking (TSN) profile carried by the segment routing header from the segment routing header of the received SRv6 service message of deterministic networking and process the message according to the TSN profile.

In this embodiment, for the convenience and conciseness of description, the detailed description of the known methods is omitted here. For the specific operating process of the first node device, refer to the corresponding process in the aforementioned method applied to the first node device; for the specific operating process of the second node device, refer to the corresponding process in the aforementioned method applied to the second node device, and therefore they will not be repeated here.

Figure 14:
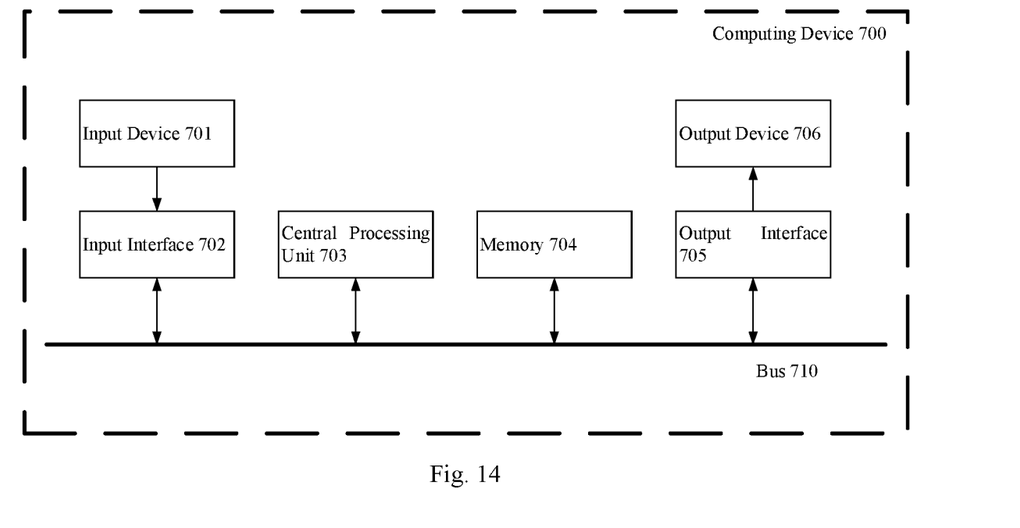
FIG. 14 is a structural diagram illustrating a hardware architecture of a computing device capable of implementing the message forwarding method and the node devices according to the present disclosure.

FIG. 14 is a structural diagram illustrating a hardware architecture of a computing device capable of implementing the message forwarding method and the node devices according to the present disclosure.

As shown in FIG. 14, the computing device 700 includes an input device 701, an input interface 702, a central processing unit 703, a memory 704, an output interface 705, and an output device 706. The input interface 702, the central processing unit 703, the memory 704 and the output interface 705 are connected to one another through a bus 710. The input device 701 and the output device 706 are connected to the bus 710 respectively through the input interface 702 and the output interface 705 and thereby connected to other components of the computing device 700.

In some embodiments, the input device 701 receives input information from the outside and transmits the input information to the central processing unit 703 through the input interface 702. The central processing unit 703 processes the input information based on computer-executable instructions stored in the memory 704 to generate output information, temporarily or permanently stores the output information in the memory 704, and then transmits the output information to the output device 706 through the output interface 705. The output device 706 outputs the output information to the outside of the computing device 700 for use by a user.

In an embodiment, the computing device 700 shown in FIG. 14 may be implemented as a message forwarding device, which may include a memory and a processor, where the memory is configured to store a program which, when executed by a processor cause the processor to perform the message forwarding method described in the aforementioned embodiments.

What has been described above are merely embodiments of the present disclosure, and is not intended to limit the scope of protection of the present disclosure. Generally speaking, various embodiments of the present disclosure may be implemented in hardware or dedicated circuits, software, logics or any combination thereof. For example, some aspects may be implemented in hardware, while other aspects may be implemented in firmware or software that may be executed by a controller, a microprocessor or other computing devices, although the present disclosure is not limited thereto.

Embodiments of the present disclosure may be implemented by a data processor of a mobile device executing computer program instructions, e.g. in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source codes or object codes complied by any combination of one or more programming languages.

The block diagram of any logic flow in the drawings of the present disclosure may represent program steps, interconnected logic circuits, modules and functions, or a combination of program steps with logic circuits, modules and functions. The computer program may be stored in the memory. The memory may be of any type suitable for a local technical environment, and may be implemented using any suitable data storage technology, for example, but not limited to, a read-only memory (ROM), a random access memory (RAM), an optical memory device and system (digital versatile disc DVD or CD), etc. A computer-readable medium may include a non-transitory storage medium. The data processor may be of any type suitable for the local technical environment, for example, but not limited to, a general-purpose computer, a special-purpose computer, a microprocessor, a digital signal processor (DSP), an application specific integrated circuit (ASIC), a programmable logic device (FGPA) and a processor based on a multi-core processor architecture.

The detailed description of the embodiments of the present disclosure has been provided above through non-limiting examples. However, considered with reference to the drawings and the claims, various modifications and adjustments to the above embodiments will be apparent to those having ordinary skills in the art without departing from the scope of the present disclosure. Therefore, the proper scope of the present disclosure will be determined by the claims.

What is claimed is:

1. A message forwarding method, applied to a first node device, comprising:
    carrying a time sensitive networking (TSN) profile in a segment routing header of a segment routing Internet protocol version 6 (SRv6) service message of deterministic networking, comprising:
        determining a TSN profile according to the category and/or characteristic of a service flow of a predetermined message, wherein the predetermined message is a received TSN service message or an SRv6 service message obtained after flow mapping according to the TSN service message; and
        carrying the TSN profile in a Type-Length-Value (TLV) format in the segment routing header;
    wherein a Type field in the TLV format is used to indicate the type of the TSN profile, and a Value field in the TLV format is used to indicate the TSN profile in each predetermined application scenario,
    wherein the value of the Value field is a TSN profile in a predetermined application scenario; or the Value field comprises a SCENARIO field and a SPECIFIED field, wherein the SCENARIO field is used to identify a predetermined application scenario, and the SPECIFIED field is used to identify a TSN profile corresponding to the predetermined application scenario, the predetermined application scenario comprises at least one of Time-Sensitive Networking for Fronthaul application scenario, Industrial Automation application scenario, Quality of Quality of Service Provision by Network Systems application scenario, Service Provider Networks application scenario, Automotive In-Vehicle Ethernet Communications application scenario, or Enhancements to Fronthaul Profiles to Support New Fronthaul Interface, Synchronization, and Syntonization Standards application scenario;
    performing flow matching and flow mapping on header information of a received TSN service message, wherein, performing flow matching comprises determining a service flow identifier of the TSN service message according to message attribute information and a flow matching rule, the flow matching rule comprises a corresponding relationship between the message attribute information and the service flow identifier, and the service flow identifier is used to identify the TSN service message containing the message attribute information, and performing flow mapping comprises converting the TSN service message into an SRv6 service message of deterministic networking;
    determining a TSN profile corresponding to the service flow identifier according to the TSN service message based on a mapping relationship between the service flow identifier and the TSN profile; and
    carrying predetermined deterministic service configuration information and the TSN profile in a segment routing header of the SRv6 service message of deterministic networking; and
    sending the SRv6 service message carrying the TSN profile.

2. The method of claim 1, wherein carrying a TSN profile in a segment routing header of an SRv6 service message of deterministic networking comprises:
    carrying optional Type-Length-Value information in the segment routing header, wherein the optional Type-Length-Value information is used to carry the TSN profile; or
    carrying a non-forwarding type of segment identifier (SID) in the segment routing header, wherein the non-forwarding type of SID is to carry the TSN profile; or
    carrying the TSN profile by using information of other information fields of an existing forwarding type of SID in the segment routing header.

3. A message forwarding device, comprising a memory and a processor, wherein the memory is configured to store executable program codes which, when executed by the processor, cause the processor to perform the message forwarding method of claim 1.

4. A non-transitory computer-readable storage medium, storing instructions which, when executed by a processor, cause the processor to perform the message forwarding method of claim 1.

5. A message forwarding method, applied to a second node device, comprising:
    acquiring a time sensitive networking (TSN) profile carried by a segment routing header of a received segment routing Internet protocol version 6 (SRv6) service message of deterministic networking from the segment routing header; and
    processing the message according to the TSN profile;
    wherein, the TSN profile is carried by the segment routing header of the received SRv6 service message of deterministic networking from the segment routing header through:
        determining a TSN profile according to the category and/or characteristic of a service flow of a predetermined message, wherein the predetermined message is a received TSN service message or an SRv6 service message obtained after flow mapping according to the TSN service message; and carrying the TSN profile in a Type-Length-Value (TLV) format in the segment routing header;

wherein a Type field in the TLV format is used to indicate the type of the TSN profile, and a Value field in the TLV format is used to indicate the TSN profile in each predetermined application scenario, wherein the value of the Value field is a TSN profile in a predetermined application scenario; or the Value field comprises a SCENARIO field and a SPECIFIED field, wherein the SCENARIO field is used to identify a predetermined application scenario, and the SPECIFIED field is used to identify a TSN profile corresponding to the predetermined application scenario, the predetermined application scenario comprises at least one of Time-Sensitive Networking for Fronthaul application scenario, Industrial Automation application scenario, Quality of Quality of Service Provision by Network Systems application scenario, Service Provider Networks application scenario, Automotive In-Vehicle Ethernet Communications application scenario, or Enhancements to Fronthaul Profiles to Support New Fronthaul Interface, Synchronization, and Syntonization Standards application scenario;

performing flow matching and flow mapping on header information of a received TSN service message, wherein, performing flow matching comprises determining a service flow identifier of the TSN service message according to message attribute information and a flow matching rule, the flow matching rule comprises a corresponding relationship between the message attribute information and the service flow identifier, and the service flow identifier is used to identify the TSN service message containing the message attribute information, and performing flow mapping comprises converting the TSN service message into an SRv6 service message of deterministic networking;

determining a TSN profile corresponding to the service flow identifier according to the TSN service message based on a mapping relationship between the service flow identifier and the TSN profile; and carrying predetermined deterministic service configuration information and the TSN profile in a segment routing header of the SRv6 service message of deterministic networking.

6. The method of claim 5, wherein acquiring a TSN profile carried by a segment routing header comprises:

acquiring the TSN profile through optional Type-Length-Value information carried by the segment routing header; or acquiring the TSN profile through a non-forwarding type of segment identifier (SID) carried by the segment routing header; or acquiring the TSN profile by using information of other information fields of an existing forwarding type of SID in the segment routing header.

7. A message forwarding method, comprising:

using a first node device to carry a time sensitive networking (TSN) profile in a segment routing header of a segment routing Internet protocol version 6 (SRv6) service message of deterministic networking and send the SRv6 service message carrying the TSN profile; and using a second node device to acquire the time sensitive networking (TSN) profile carried by the segment routing header from the segment routing header of the received SRv6 service message of deterministic networking and process the message according to the TSN profile;

wherein, the TSN profile is carried in the segment routing header of the received SRv6 service message of deterministic networking from the segment routing header through:

determining a TSN profile according to the category and/or characteristic of a service flow of a predetermined message, wherein the predetermined message is a received TSN service message or an SRv6 service message obtained after flow mapping according to the TSN service message; and carrying the TSN profile in a Type-Length-Value (TLV) format in the segment routing header; wherein a Type field in the TLV format is used to indicate the type of the TSN profile, and a Value field in the TLV format is used to indicate the TSN profile in each predetermined application scenario, wherein the value of the Value field is a TSN profile in a predetermined application scenario; or the Value field comprises a SCENARIO field and a SPECIFIED field, wherein the SCENARIO field is used to identify a predetermined application scenario, and the SPECIFIED field is used to identify a TSN profile corresponding to the predetermined application scenario, the predetermined application scenario comprises at least one of Time-Sensitive Networking for Fronthaul application scenario, Industrial Automation application scenario, Quality of Quality of Service Provision by Network Systems application scenario, Service Provider Networks application scenario, Automotive In-Vehicle Ethernet Communications application scenario, or Enhancements to Fronthaul Profiles to Support New Fronthaul Interface, Synchronization, and Syntonization Standards application scenario;

performing flow matching and flow mapping on header information of a received TSN service message, wherein, performing flow matching comprises determining a service flow identifier of the TSN service message according to message attribute information and a flow matching rule, the flow matching rule comprises a corresponding relationship between the message attribute information and the service flow identifier, and the service flow identifier is used to identify the TSN service message containing the message attribute information, and performing flow mapping comprises converting the TSN service message into an SRv6 service message of deterministic networking;

determining a TSN profile corresponding to the service flow identifier according to the TSN service message based on a mapping relationship between the service flow identifier and the TSN profile; and carrying predetermined deterministic service configuration information and the TSN profile in a segment routing header of the SRv6 service message of deterministic networking.

* * * * *